United States Patent [19]

Watanabe

[11] Patent Number: 5,503,263

[45] Date of Patent: Apr. 2, 1996

[54] TUBE CARRIER APPARATUS

[75] Inventor: Takahiko Watanabe, Shizuoka, Japan

[73] Assignee: Terumo Kabushiki Kaisha, Tokyo, Japan

[21] Appl. No.: 196,447

[22] Filed: Feb. 15, 1994

[30] Foreign Application Priority Data

Feb. 15, 1993 [JP] Japan .................... 5-049960

[51] Int. Cl.$^6$ ................................ B65G 47/26
[52] U.S. Cl. .................... 198/442; 198/363; 198/436
[58] Field of Search .................... 198/351, 353, 198/355, 363, 354, 436, 442, 367, 367.1, 370.03, 459.6

[56] References Cited

U.S. PATENT DOCUMENTS

| | | | |
|---|---|---|---|
| 1,000,736 | 8/1911 | Koerner | 198/442 |
| 3,835,979 | 9/1974 | Calvert et al. | 198/363 |

FOREIGN PATENT DOCUMENTS

| | | | |
|---|---|---|---|
| 1103250 | 3/1961 | Germany | 198/355 |
| 0093730 | 7/1980 | Japan | 198/442 |
| 0150919 | 7/1986 | Japan | 198/442 |
| 0285521 | 11/1989 | Japan | 198/355 |

*Primary Examiner*—James R. Bidwell
*Attorney, Agent, or Firm*—Burns, Doane, Swecker & Mathis

[57] ABSTRACT

The tube carrier apparatus is composed of carrier rails, at least a pair of rollers provided so as to pinch a flexible tube therebetween, and a driving section for rotating the rollers. The carrier falls are formed with a groove as a passage for the tube through which the tube is to be carried in the longitudinal direction thereof. When the motor is driven, both the rollers are rotated in two different rotative directions, so that the tube is pinched between the rotating rollers and the tube is then carried in accordance with the rotation of the rollers. The tube carrier apparatus is simple in structure and small in size. Alternatively, the apparatus comprises at least one first passage through which the tube is adapted to pass, a plurality of second passages through which the tube is to be carried, a switching member rotatably or movably disposed between the first and second passages and a driving mechanism for rotating or moving the switching member and including a connection passage for selectively connecting the first passage and any one of the second passages. The switching member is rotated or moved by the driving mechanism to select connection between the first tube passage and any one of the second passages.

7 Claims, 7 Drawing Sheets

TUBE CARRIER APPARATUS

BACKGROUND OF THE INVENTION

1. Field of the Invention

The present invention relates to a tube carrier apparatus for carrying a flexible tube along a passage.

2. Description of the Prior Art

In various bags, for instance such as a blood (collecting) bag for collecting blood or a blood component bag for collecting plasma, blood platelet, red blood cells, etc. which have been separated from blood by centrifugal separation, there is provided at least one flexible tube which is connected at one end thereof to the bag in order to introduce or discharge blood or a blood component into or out of the bag.

When such bags as described above or multiple bags are manufactured or fluid is automatically transferred through such a tube as described above, the tube connected to the bag is transported to a predetermined position, and the transported tube is sealed, cut off or connected to another tube or another member at the predetermined position.

As an automatic tube carrier apparatus, an apparatus which carries a tube by so-called pick and press method has been so far well known. The apparatus is provided with a carrier head movable in two or three different dimensional directions. A chuck which chucks an end of the tube is mounted on the carrier head. The carrier head is movable to a predetermined destination to carry the chucked tube. In the prior art tube carrier apparatus as described above, however, there is such problems in that the mechanism for moving the carrier head is complicated and thereby the apparatus becomes large in size.

In particular, in order to keep the tube shape unchanged between before and after the tube is carried by the prior art apparatus, the tube must be chucked at a plurality of different positions. Therefore, when the total length of the tube to be carried is large, the number of chucks is inevitably increased, with the result that the carrier head becomes massive in size and thereby the carrier apparatus becomes large in size.

In addition, there is a case that a tube must be selectively carried to two or more predetermined destinations. In a case where such a need is arisen in the prior art tube carrier apparatus, since all the tube carrier heads must be so constructed as to be movable within a range in which a plurality of predetermined destinations are included, the mechanism becomes further complicated and the size thereof becomes also large. In addition, the moving sequence of the carrier heads becomes complicated. Furthermore, in the prior art apparatus, there is another problem that it takes a relatively long time to carry the tube to the predetermined destination.

SUMMARY OF THE INVENTION

A main object of the present invention is to enable a tube to be carried with a relatively small apparatus having simple construction.

The other object of the present invention is to provide a tube carrier apparatus which can carry a tube to two or more destinations from two or more carrier starting positions.

In order to achieve the above main object, a tube carrier apparatus for carrying a flexible tube in a longitudinal direction thereof according to the present invention comprises carrier rails each having a passage through which the tube is to be carried, at least one pair of rollers between which the flexible tube is pinched and which rotate for carrying the pinched tube, and driving means for rotating said rollers.

According to the present invention, it becomes possible to realize a tube carrier apparatus having simple construction and reduced size, without providing any carrier head which chucks a tube to be carried and then carries it to the destinations. Further, the manufacturing cost thereof can be reduced. Furthermore, according to the present invention, since a tube carry passage can be freely designed by arranging the carrier rails appropriately, it is not necessary for the tube carrier apparatus to have complicated construction and increased size even if the carry passage is long or the tube to be carried is long.

Preferably, the passage is formed as a groove formed in each of the carrier rails. Further, preferably, a coating layer of low friction material can be formed on the inner surface of the passage, and a cover member for covering all or a part of opening portion of the groove can be provided.

Further, in order to achieve the other object, a tube carrier apparatus for carrying a flexible tube in a longitudinal direction thereof according to the present invention comprises at least one first passage through which the tube is to be carried, a plurality of second passages through which the tube is to be carried, switching means rotatably or movably disposed between the first and second passages, the switching means including a connection passage for selectively connecting the first passage and any one of the second passages, and driving means for rotating or moving said switching means. When the switching means is rotated or moved by the driving means, the first passage is selectively connected to ally one of the second passages.

According to the tube carrier apparatus as described above, it becomes possible to realize a tube carrier apparatus having simple construction and reduced size, without providing any carrier head which chucks a tube to be carried and then carries it to the destinations. Further, the manufacturing cost thereof can be reduced. Furthermore, according to the above described tube carrier apparatus, since the tube carry passages can be freely designed by simply arranging the carrier rails appropriately, it is not necessary for the tube carrier apparatus to have complicated construction and increased size even if the carry passage is long or the tube to be carried is long. Moreover, it is possible to carry the tubes from a plurality of carry starting positions to a plurality of carry destinations securely. Furthermore, the tube carry destinations can be selected or changed by simply moving or rotating the switching means, so that the operation can also be simplified.

In this invention, each of the first and second passages can be formed from a groove formed on each carrier rail. Further, preferably, a coating layer of low friction material can be formed on the inner surface of each passage, and a cover member for covering all or a part of opening portion of each groove can be provided.

Further, preferably, the at least one first passage can be provided on an upstream side of the tube carry direction and the second passages are provided on a downstream side thereof in such a manner that the tube which has passed through the first passage is distributed to any one of the second passages by means of the switching means. On the other hand, it is also possible to provide the second passages on the upstream side of the tube carry direction and the at least one first passage on the downstream side thereof in such a manner that the tube which has passed through any one of the second passages is distributed to the first passage by means of the switching means.

Furthermore, in order to achieve the main and the other objects, a tube carrier apparatus for carrying a flexible tube in a longitudinal direction thereof according to the present invention comprises at least one first passage through which the tube is to be carried, a plurality of second passages through which the tube is be carried, tube feeding means provided in the first passage for feeding the tube in a longitudinal direction of the passage, switching means rotatably or movably disposed between the first and second passages, the switching means including a connection passage for selectively connecting the first passage and any one of the second passages, and driving means for rotating or moving the switching means. When the switching means is rotated or moved by the driving means, connection between the first passage and any one of the second passages is selected so as to distribute the tube fed from the first passage to any one of the second passages.

According to the tube carrier apparatus as described above, in addition to the effects and functions of the above described tube carrier apparatuses, it is possible to carry the tubes from tile carry starting positions to the carry destination positions continuously, so that the tubes can be carried more rapidly. Further, these advantages can be obtained irrespective of the patterns of the carrier routes or the length of the routes.

Other objects, structures and advantages of the present invention will be apparent from the following description of the embodiments described with reference to the accompanying drawings.

DETAILED DESCRIPTION OF THE PREFERRED EMBODIMENTS

The tube carrier apparatus according to the present invention will be described hereinbelow with reference to the preferred embodiments shown in the attached drawings.

Figure 1:
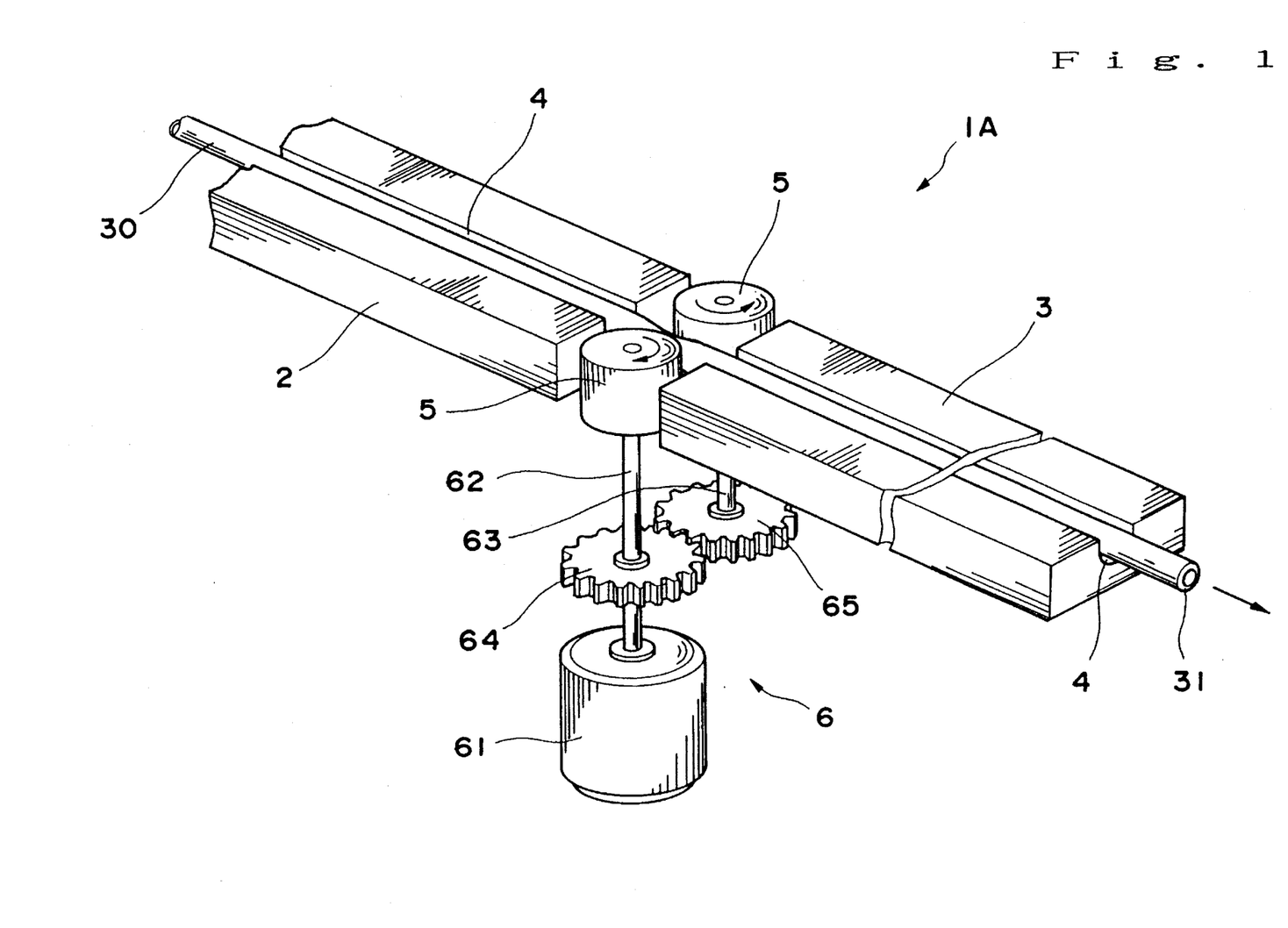
FIG. 1 is a perspective view showing a first embodiment of the tube carrier apparatus according to the present invention.

FIG. 1 is a perspective view showing a first embodiment of a tube carrier apparatus according to the present invention. As shown in FIG. 1, the tube carrier apparatus 1A for carrying a flexible tube 30 in a longitudinal direction thereof comprises a plurality of carrier rails 2 and 3 which define a carry passage for the tube 30, a pair of rollers 5 interposed between the two carrier rails 2 and 3, and driving means 6 for rotating the rollers 5. A tube feeding means for feeding the tube along the passage is composed of the rollers 5 and the driving means 6.

A plurality of the carrier rails 2 and 3 are arranged along the carrier route of the tube 30. In an exemplary structure as shown in FIG. 1, there are shown only a carrier rail 2 positioned on an upstream side of the tube carry direction (hereinafter, simply referred to as "upstream side") and a carrier rail 3 positioned on a downstream side of the tube carry direction (hereinafter, simply referred to as downstream side).

Each of the carrier rails 2 and 3 is formed with a groove 4 having a U-shape in cross section. The groove 4 serves a passage through which the tube 30 is to be carried in the longitudinal direction thereof. In this case, the width of the formed groove 4 is designed to be slightly larger than an outer diameter of the tube 30 to be carried.

The cross sectional shape of the groove 4 can be formed into any shapes such as V-shape or concaved-shape, without being limited to only the U-shape.

Figure 2:
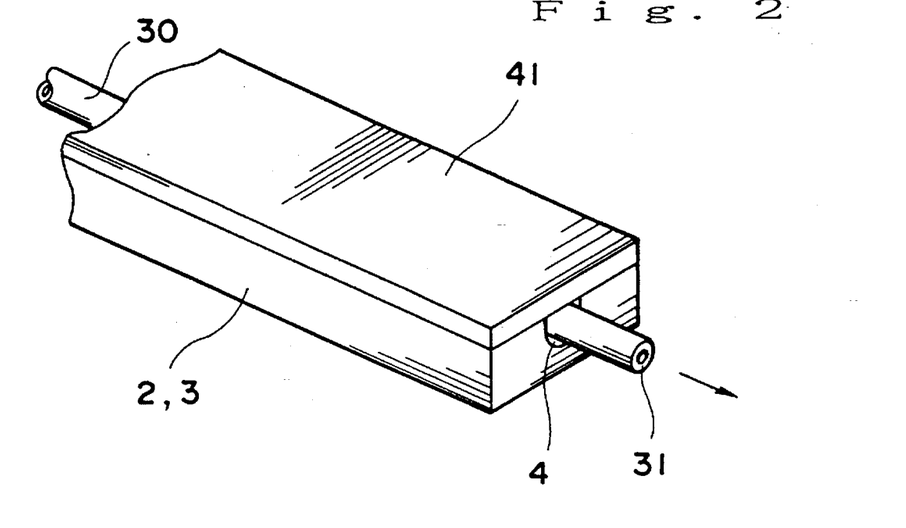
FIG. 2 is a perspective view showing a modification of the carrier rail of the tube carrier apparatus according to the first embodiment.
Figure 3:
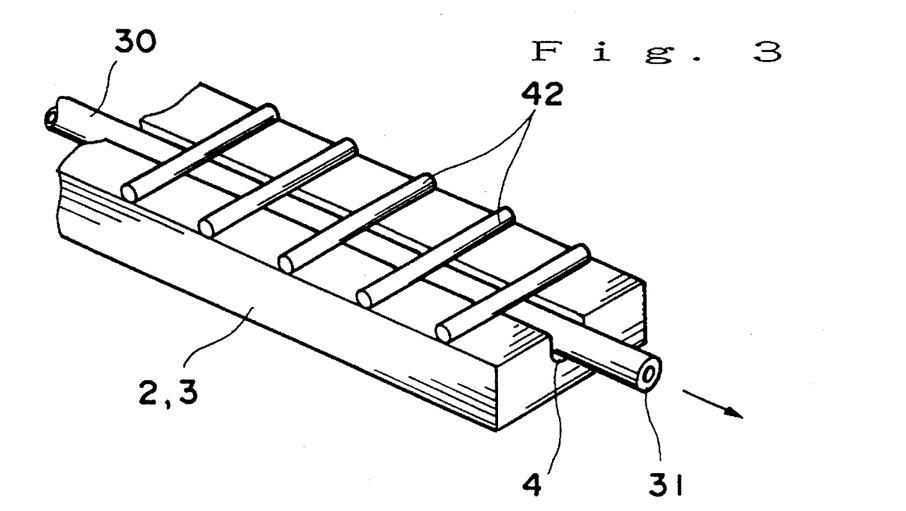
FIG. 3 is a perspective view showing another modification of the carrier rail of the tube carrier apparatus according to the first embodiment.

Further, in this embodiment, it is preferable to provide, at the upper portion of the groove 4, a plate-shaped cover member 41 for covering the open side of the groove 4 as shown in FIG. 2 or a plurality of rod-shaped (or frame-shaped) cover members 42 crossing over the open side of the groove 4 as shown in FIG. 3, in order to prevent the carried tube 30 from being dislocated from the groove 4.

Figure 4:
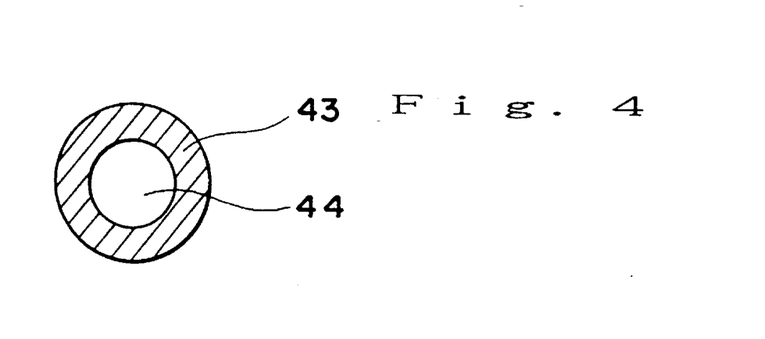
FIG. 4 is a cross-sectional view showing other modification of the carrier rail of the tube carrier apparatus according to the present invention.

Further, it is also possible to use a tubular carrier member 43 formed with a hollow passage 44 which serves as a tube passage, as shown in FIG. 4. Thus formed passage can have the function similar to those having the cover members 41 and 42.

Further, in the embodiment, it is also preferable to treat the inner surface of the passage such as the groove 4 or the passage 44 so that the sliding resistance between the tube 30 and the inner surface can be reduced. As the abovementioned treatment, at least one coating layer (not shown) of a low friction resistance can be formed on the inner surface of the passage, for instance.

As the material for the coating layer, it is possible to use various high molecular substances, such as polytetra fluoroethylene (Teflon), fluorine-based resin, polyamide, polyacetal, polyethylene telephtalate (PET), polybutylene telephtalate (PBT), hard polyvinyl chloride, high density polyethylene, polyphenylene oxide, polyphenylen sulfide, polysulfone, polyether ketone (PEK), polyether-ether ketone (PEEK), etc. or low friction material or wear-resistant material such as various glasses, for instance.

The thickness of the coating layer as described above is preferably from about 10 μm–3 mm, and more preferably from about 10 μm–1 mm.

Further, as other treatments, it is possible to coat the inner surface of the passage with lubricant formed of hydrophilic high-molecular substances such as wax, paraffin, silicone oil, olive oil, glycerol, polyethylene glycol, etc.

Further, in the structure as shown in FIG. 1, there are shown the carrier rails 2 and 3 which are formed with a straight groove 4, respectively. However, according to the present invention, it is also possible to form the groove 4 such that it is curved in any desired direction along the rails 2 and 3. In this case, since the tube 30 is flexible, the flexible tube 30 can be carried along the curved groove 4. Further, the groove 4 can be formed into a bifurcated form.

Further, a pair of rollers 5 are disposed between the end portion of the carrier fall 2 at the downstream side thereof and the end portion of the carrier rail 3 at the upstream side thereof in such a way as to be opposed with each other through the carry passage of the tube 30. Therefore, when the tube 30 is required to be carried, the tube 30 is pinched between both the rollers 5 and then the rollers 5 are rotated in a predetermined rotative direction.

In the present invention, it is preferable to cover the outer circumferential surfaces of the rollers 5 with various rubber materials such as natural rubber, isoprene rubber, butadiene rubber, silicone rubber, nitrile rubber, propylene rubber, urethane rubber, etc. or various elastic materials such as polyurethane, thermoplastic elastomers (styrene based, olefin based, urethane based, ester based, etc.). Further, it is also preferable to form concave or convex portions extending in the rotary axis direction of the rollers on the outer circumferential surfaces thereof. In this case, since it is possible to prevent the rollers 5 from being slipped on the outer circumference of the tube 30, the tube 30 can be carried more securely.

The above-mentioned rollers 5 are driven or rotated by driving means 6. The driving means 6 is composed of a driving force source (a motor 61), a motor rotary shaft 62, a driven shaft 63, a gear 64 fixed to the rotary shaft 62, and another gear 65 fixed to the driven shaft 63 so as to mesh with the gear 64. The rollers 5 are fixed to the upper end portions of the rotary shaft 62 and the driven shaft 63, respectively.

Therefore, when the motor 61 is driven, one of the rollers 5 is driven via the rotary shaft 62 in a predetermined rotative direction. Further, the rotating force of the rotary shaft 62 is transmitted to the driven shaft 63 through the gears 64 and 65 to rotate the other roller 5 in an opposite rotative direction. In this case, In a case where the outer diameters of the rollers 5 are equal to each other, it is preferable to equalize the number of teeth of the gears 64 to that of the gear 65 to obtain the same rotating speed of the rollers 5. Further, the driving means 6 may be provided with rotational speed change means Further, it is also possible to arrange a plurality of pairs of the rollers 5 along the carry passage of the tube 30. For example, about ten carrier rails of a predetermined length are arranged so as to constitute the carry passage of the tube 30, and a pair of rollers 5 are disposed at each portion between two adjacent carrier rails as shown in FIG. 1. In this case, it is not necessary to drive all pairs of the rollers 5 arranged along the carry passage. There is no problem if some pairs of rollers 5 are replaced with idler rollers which rotate freely. Further, it is possible to constitute the carrier rails 2, 3 so that the rollers 5 are embedded therein under the condition that a part of each roller is exposed in the groove 4.

The purpose of use of the tube 30 to be carried by this apparatus is not limited to a specific purpose. Namely, for example, the tube 30 can be used as tubes to be connected to various bags such as blood bag, blood collecting bag, blood component bag, blood tranfusion bag, dialysis bag, liquid discharge bag, urine introducing bag, etc. Further, the tube 30 can also be used as tubes for constituting a part of a blood collecting apparatus or a blood transfusing apparatus or tubes for constituting circulation circuits of blood or blood component for an artificial lung or an artificial dialysis system, etc. Furthermore, the tube 30 can also be used as tubes for various catheter tubes to be inserted into a living body such as a digestive canal, blood vessel, urethral canal, bile duct, etc. or artificial internal tubular organs such as artificial blood vessel retained in a living body.

As a material of the tube 30, it is possible to selectively use one or more of various materials including polyvinyl chloride; polyolefin such as polyethylene, polypropylene, EVA; polyester such as PET or PBT; polyurethane; polyamide; silicone; or thermoplastic elastomer such as polyester elastomer, polyamide elastomer, styrene-butadiene copolymer. However, among these materials, the polyvinyl chloride is particularly preferable as the material of the tube 30, since it is most suitable when the mass production process of the tubes is automated.

Further, although the dimension of the tube 30 is not limited specifically, the preferable dimension of the tube 30 is about 3 mm to 30 mm and more preferably 3 mm to 8 mm at the outer diameter thereof, and about 0.1 m to 5 m and more preferably 0.3 m to 2 m in the length thereof.

The operation of the tube carrier apparatus 1A will be described hereinbelow.

As shown in FIG. 1, the driving means 6 (the motor 61) is driven to rotate a pair of the rollers 5 in a predetermined rotative direction. Under these conditions, when an end 31 of the tube 30 carried in and along the groove 4 of the carrier rail 2 reaches a position at which two rollers 5 are arranged so as to be opposed with each other, the tube 30 is pinched between the two rollers 5. In this case, the tube 30 is pushed and moved toward the downstream side in accordance with the rotation of the rollers 5, so that the tube 30 is carried to the downstream side in and along the groove 4 of the carrier fall 3.

For example, where the two carrier rails 2 and 3 and a pair of the rollers 5 are arranged alternately all over the carry passage for the tube 30, the tube 30 is pulled and carried by the driven rollers 5 to a destination in and along the respective grooves (passages) 4 of the respective carrier rails.

In the tube carrier apparatus 1A of the present invention, it is possible to carry the end 31 of the tube 30 to any given destinations along the carry passage of the tube 30. In other words, when the tube 30 is being carried along the carry passage by the rotating rollers 5 and thereby the end 31 of the tube 30 reaches a predetermined destination, the rollers 5 are stopped from being rotated, so that it is possible to carry the end 31 of the tube 30 to the desired destination. Further, when the rollers 5 are rotated or stopped repeatedly, it is possible to carry the end 31 of the tube 30 to a plurality of any desired destinations along the carry passage.

The above-mentioned carry of the tube 30 to any given destinations can be achieved by various control methods, which are for example as follows: (1) driving timing of the motor 61 is controlled by control means (not shown) provided with a timer; or (2) the position of the end 31 of the tube 30 is detected by tube position detecting means (a sensor such as optical sensor, magnetic sensor, touch sensor, etc.) (all not shown) disposed on the carry passage of the tube 30, and the rollers 5 are controllably rotated or stopped on the basis of signals fed from the sensor.

Figure 5:
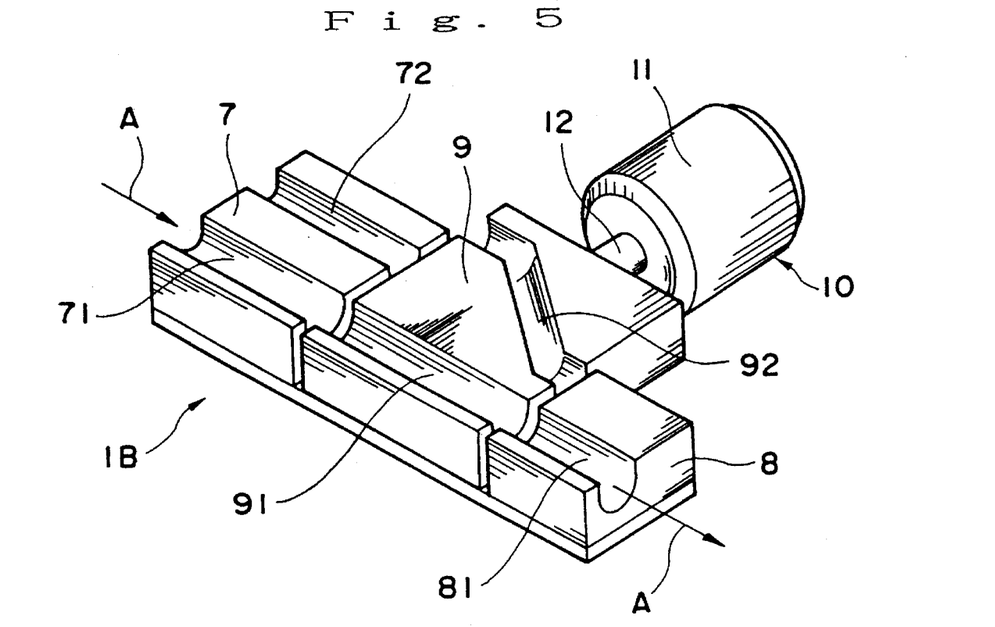
FIGS. 5 is a perspective view showing a second embodiment of the tube carrier apparatus according to the present invention.
Figure 6:
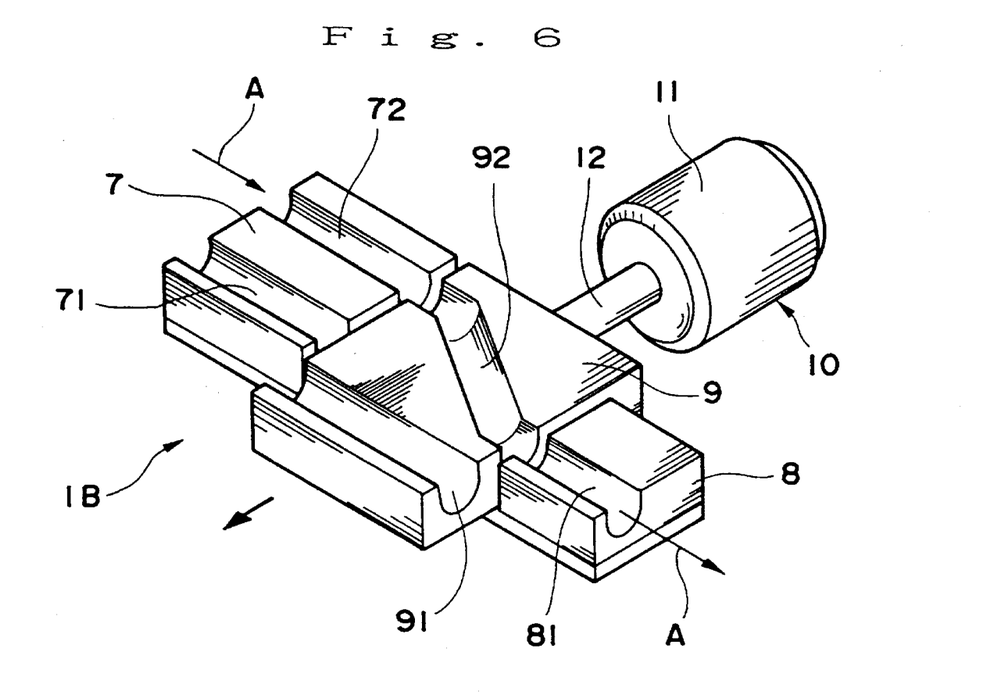
FIG. 6 is a perspective view showing operational condition of the second embodiment.

FIGS. 5 and 6 show, the second embodiment of the tube carrier apparatus according to the present invention. As shown, the tube carrier apparatus 1B for carrying the flexible tube in the longitudinal direction thereof according to this second embodiment is composed of carrier rails 7 and 8 for defining the tube carry passage, a switching member 9 interposed between two carrier rails 7 and 8, and driving means 10 for moving the switching member 9.

The carrier rail 7 of this embodiment is formed with two grooves 71 and 72 which constitute second passages and through which the tube (not shown) similar to the tube 30 is to be carried. The cross section of each of these grooves 71 and 72 is formed into a U-shape configuration.

On the other hand, the carrier rail 8 is formed with one tube passage 81 which constitutes a first passage and through which the tube 30 is to be carried. The cross section of the groove 81 is also formed into a U-shape configuration.

Further, the switching member 9 whose width is wider than that of each carrier rail 7, 8 is formed with two grooves 91 and 92. These grooves 91 and 92 constitute connection passages through which the tube can be passed. The cross section of each of these grooves 91 and 92 is also formed into a U-shape configuration. In this embodiment, the groove 91 is formed into a straight line and both ends of the groove 91 are connected to the groove 71 of the carrier rail 7 and the groove 81 of the carrier rail 8, respectively, as shown in FIG. 5. On the other hand, the groove 92 is bent into roughly a S-shape or wave shape, and both ends thereof are so formed as to be connected to the groove 72 of the carrier rail 7 and the groove 81 of the carrier rail 8, as shown in FIG. 6, when shifted.

Further, the respective widths of the grooves 71, 72, 81, 91 and 92 are all determined to be slightly larger than the outer diameter of the tube to be carried. Further, without being limited to only the U-shape, it is possible to form these grooves 71, 72, 81, 91 and 92 into any given cross-sectional shapes such as V shape or concaved-shape, for instance.

Further, it is also possible to provide a cover member 41 or 42 (as already explained with reference to FIGS. 2 and 3) over the respective grooves 71, 72, 81, 91 and 92 in order to prevent the carried tube from being dislocated from the grooves, respectively.

Further, in the same way as with the case of the first embodiment, when the inner surfaces of these grooves 71, 72, 81, 91 and 92 are coated with a low friction material, it is possible to improve the slidability of the tube to be carried.

The switching member 9 is moved or shifted by the driving means 10 in the width direction thereof, that is, in the direction perpendicular to the grooves 71, 72 and 81. The driving means 10 is composed of a solenoid as a driving power source 11 and a plunger 12 whose end is fixed to the side surface of the switching member 9.

When the solenoid 11 is not energized, the plunger is retracted as shown in FIG. 5, for instance. In this case, the switching member 9 is located at such a position that both ends of the groove 91 of the switching member 9 are connected to the grooves 71 and 81, respectively, so that a tube carry passage can be determined by the grooves 71, 91 and 81.

On the other hand, when the solenoid 11 is energized, the plunger 12 is extended as shown in FIG. 6. In this case, the switching member 9 is located at such a position that both ends of the groove 92 of the switching member 9 are connected to the grooves 72 and 81, so that another tube carry passage can be determined by the grooves 72, 92 and 81.

In the tube carrier apparatus 1B as described above, there are two tube carry directions. That is, the tube can be carried toward two different opposite directions. In one direction, the carrier rail 7 is determined to be an upstream side of the carry direction of the tube, and in the other direction the carrier rail 8 is determined to be the upstream side thereof. FIGS. 5 and 6 show the case where the carrier rail 7 is determined to be the upstream side and the carrier rail 8 is determined to be the downstream side. In this case, when the tube which has passed through any one of the grooves 71 and 72 of the carrier rail 7 as shown by an arrow A in FIGS. 5 and 6 the tube is guided into the groove 81 of the carrier rail 8 in accordance with the switching operation of the switching member 9.

Under these switching operations, the non-selected tube passage of the carrier rail 7; that is, the groove 72 (in FIG. 5) and the groove 71 (in FIG. 6) are shut off by an end surface of the switching member 9, even if the tube has passed through these grooves 72 and 71. Namely, the tube is brought into contact with the end surface of the switching member 9 and thereby stopped at that position. As a result, it is possible to prevent an erroneous distribution of the tube into the groove 81 of the carrier rail 8.

In addition, the tube carrier apparatus 1B can carry the tube also in a direction opposite to the arrow direction A in FIGS. 5 and 6. In this case, the carrier rail 8 is determined to be the upstream side of the tube carry direction and the carrier rail 7 is determined to be the downstream side thereof. The tube which has passed through the groove 81 of the carrier rail 8 can be selectively guided into any one of the grooves 71 and 72 of the carrier rail 7 by selectively moving or shifting the switching member 9.

Figure 7:
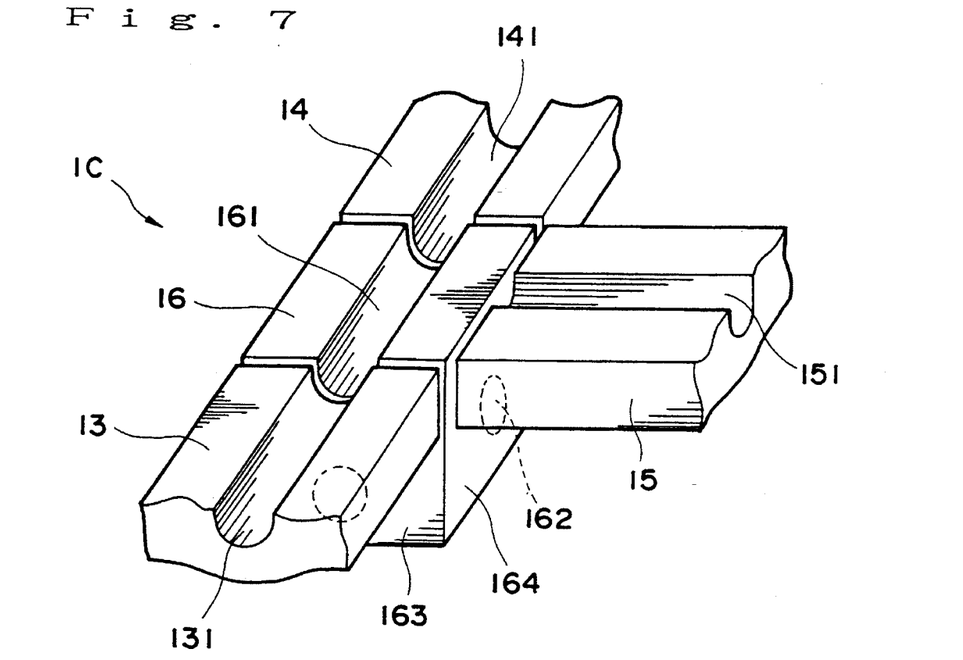
FIGS. 7 is a perspective view showing a third embodiment of the tube carrier apparatus according to the present invention.
Figure 8:
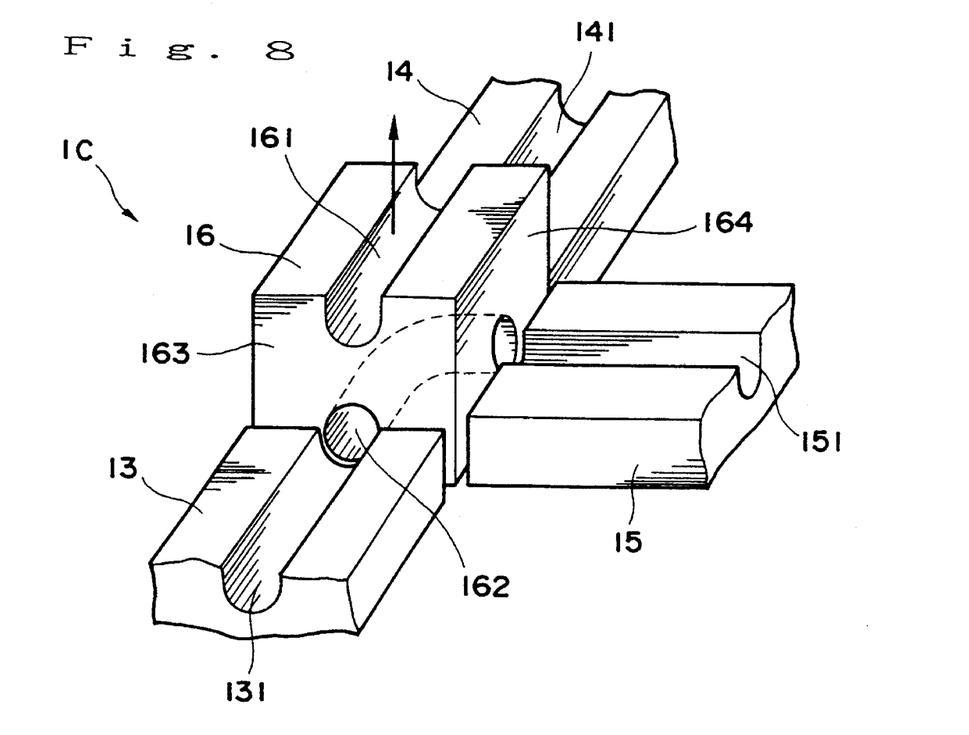
FIG. 8 is a perspective view showing operating condition of the third embodiment.

FIGS. 7 and 8 are perspective views showing the third embodiment of the tube carrier apparatus according to the present invention. The tube carrier apparatus 1C for carrying a flexible tube in the longitudinal direction thereof is composed of three carrier rails 13, 14 and 15 which define tube carry passages, a switching member 16 disposed among these carrier rails, and driving means (not shown) for moving the switching member 16.

The carrier rails 13 and 14 are both arranged in the same direction, and the carrier rail. 15 is arranged in the direction perpendicular to the carrier rails 13 and 14. The carrier rails 13, 14 and 15 are all formed with grooves 131, 141 and 151 of a U-shape in cross section, respectively, which serve to carry a tube (not shown) similar to the tube 30.

The switching member 16 is a block-shaped member so disposed as to be moved up and down at a position enclosed by the end surfaces of the respective carrier rails 13, 14 and 15. Further, the switching member 16 is formed with a straight groove 161 and a bent through hole 162 which serve as connection pass;ages through which the tube can pass. The cross section of the groove 161 is of U-shape and the cross section of the through hole 162 is of circular shape.

In this embodiment, both ends of the groove 161 are open at two opposing end surfaces of the switching member 16, respectively so as to be connected to the groove 131 of the carrier rail 13 and the groove 141 of the carrier rail 14, as shown in FIG. 7. On the other hand, both ends of the through hole 162 are open at two perpendicular side surfaces 163 and 164 of the switching member 16 so as to be connected to the groove 131 of the carrier rail 13 and the groove 151 of the carrier rail 15, as shown in FIG. 8.

Further, the width of the grooves 131, 141, 151 and 161 and the inner diameter of the through hole 162 are determined to be slightly larger than the outer diameter of the tube to be carried. In this regard, it should be noted that the cross-sectional shapes of these grooves 131, 141, 151 and 161 and the through hole 162 are not limited to only the shapes as shown in FIGS. 7 and 8.

Further, it is also preferable to dispose the cover members 41 or 42 as already described over the respective grooves 131, 141, 151 and 161, respectively to prevent the carried tube from being dislocated from the grooves.

Further, when the liner surfaces of these grooves 131, 141, 151 and 161 and the through hole 162 are coated with a low friction material in the same way as the afore-mentioned embodiments, it; is possible to improve the slidability of the tube to be carried.

The switching member 161 is moved up and down, that is, in the direction perpendicular to the grooves 131, 141 and 151 in FIGS. 7 and 8 by driving means (not shown) similar to the afore-mentioned driving means 10 as shown in FIGS. 5 and 6.

When the switching member 16 is located at the lower position by the driving means as shown in FIG. 7, both ends of the groove 161 are connected to the groove 131 of the carrier rail 13 and to the groove 141 of the carrier rail 14, so that a straight tube carry passage can be formed by the grooves 131, 161 and 141.

On the other hand, when the switching member 16 is located at the upper position by the driving means as shown in FIG. 8, both ends of the through hole 162 are connected to the groove 131 of the carrier rail 13 and to the groove 151 of the carrier rail 15, so that an L-shaped tube carry passage can be formed by the groove 131, the through hole 162 and the groove 151.

In the tube carrier apparatus 1C of this embodiment, the tube carry direction is any one of the following two cases. Namely, in one case, the carrier rails 14 and 15 are determined to be the upstream side and the carrier rail 13 is determined to the downstream side, and in the other case, the carrier rail 13 is determined to be the upstream side and the carrier rails 14 and 15 are determined to be the downstream side.

Figure 9:
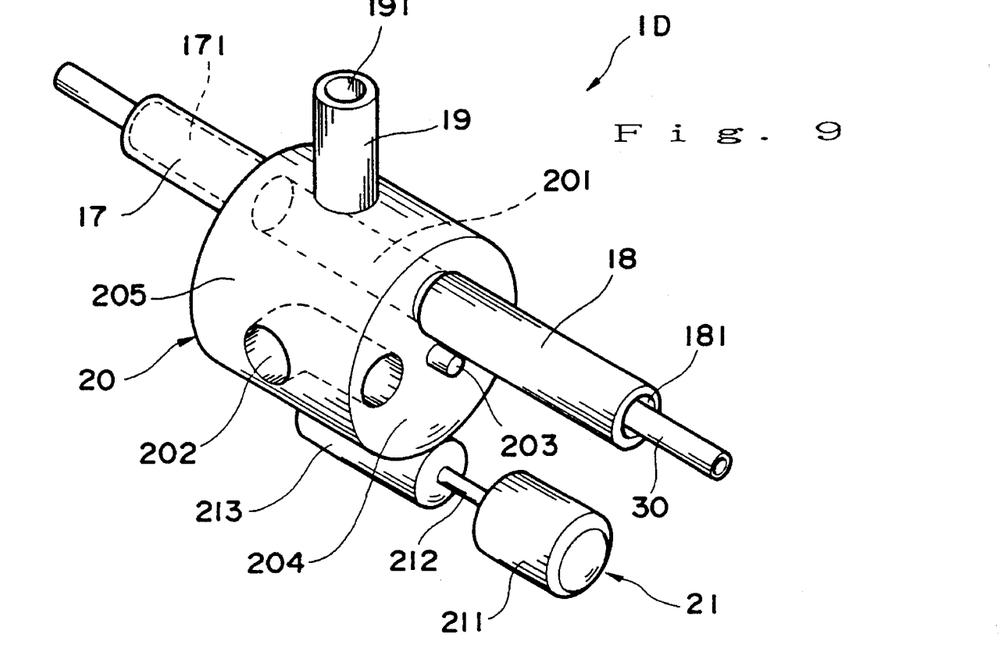
FIGS. 9 is a perspective view showing a fourth embodiment of the tube carrier apparatus according to the present invention.
Figure 10:
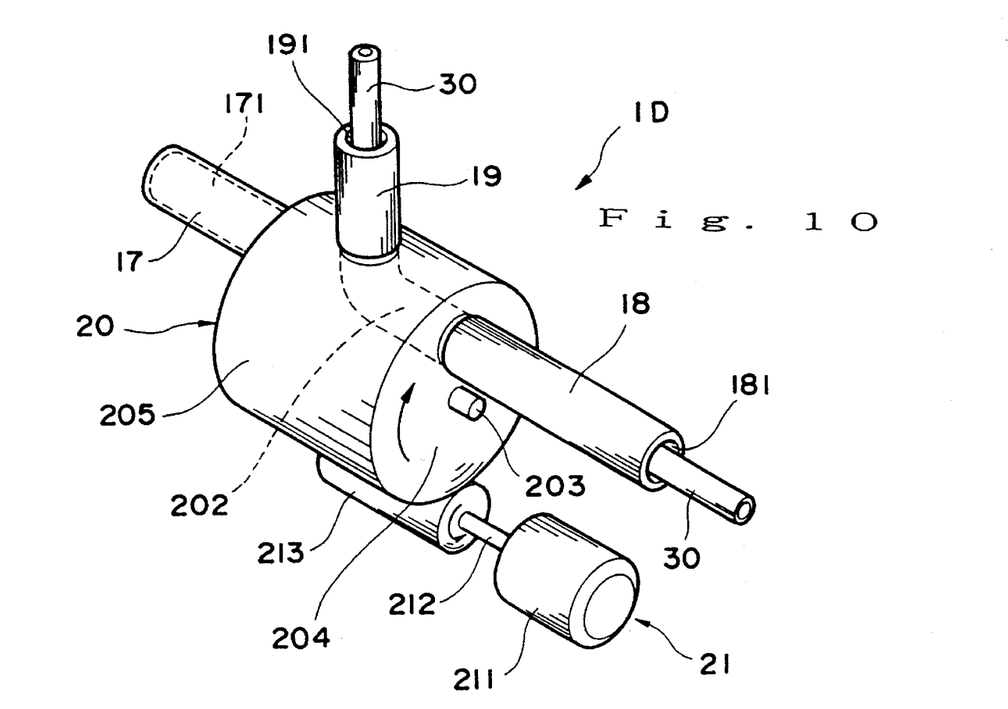
FIG. 10 is a perspective view showing operating condition of the fourth embodiment.

FIGS. 9 and 10 are perspective views showing the fourth embodiment of the tube carrier apparatus according to the present invention. The tube carrier apparatus 1D for carrying a flexible tube 30 in the longitudinal direction thereof is composed of three carrier rails 17, 18 and 19 which define tube carrier passages, a switching member 20 interposed among these carrier rails, and driving means 21 for moving the switching member 20.

The carrier rails 17, 18 and 19 are all formed by a tubular member, respectively as shown in FIG. 4. That these carrier falls are formed with hollow passages 171, is, 181 and 191 of a circle in cross section, respectively as the carrier passages through which the tube 30 can be passed. The carrier rails 17 and 18 are arranged in the same direction, and the carrier rail 19 is arranged in a direction (vertical direction in the drawings) perpendicular to the carrier rails 17 and 18.

The switching member 20 is formed into a cylindrical member so disposed as to be rotatable at a position enclosed by the end portions of the respective carrier rails 17, 18 and 19. Here, the rotary shaft 203 of the switching member 20 is disposed roughly in parallel to but eccentrically to the hollow passages 171 and 181 of the carrier rails 17 and 18.

Further, the switching member 20 is formed with a straight through hole 201 and a bent through hole 202 as connection passages for carrying the tube. The cross section of both through holes 201 and 202 is a circle in cross section, and formed at positions eccentric from the rotary shaft 203 of the switching member 20.

In this embodiment, both ends of the through hole 201 are open at two opposing end surfaces of the switching member 20, respectively so as to be connected to the hollow passage 171 of the carrier rail 17 and the hollow passage 181 of the carrier rail 18, as shown in FIG. 9. On the other hand, both ends of the bent through hole 202 are open at one side surface 204 and the outer circumferential surface 205 of the switching member 20 so as to be connected to the passage 181 of the carrier rail 18 and the passage 191 of the carrier rail 19, as shown in FIG. 10.

Further, the inner diameters of the passages 171, 181 and 191 and the through holes 201 and 202 are determined to be slightly larger than the outer diameter of the tube 30 to be carried. Further, the cross-sectional shapes of these hollow passages 171, 181 and 191 and the through holes 201 and 202 are not limited to only the shapes as shown in FIGS. 9 and 10.

Further, it is also preferable to form a coating layer of a low friction material on the inner surfaces of the respective passages 171, 181 and 191 and the through holes 201 and 202 respectively to improve the slidability of the tube 30 to be carried, in the same way as with the cases of the aforementioned embodiments.

The switching member 20 is rotated by the driving means 21 with the rotary shaft 203 as its center in one or two rotative directions. The driving means 21 is composed of a motor 211, a rotary shaft 212 of the motor 211, and a roller 213 fixed to an end of the rotary shaft 212. The roller 213 is formed of an elastic material such as rubber, and the outer circumferential surface thereof is brought into pressure contact with the outer circumferential surface 205 of the switching member 20. Accordingly, when the roller 213 is rotated by the motor 211 in a predetermined rotative direction, the switching member 20 which is brought into pressure contact with the outer circumferential surface of the roller 213 is rotated in a rotative direction opposite to that of the roller 213.

When the switching member 16 is rotated by the driving means 21 to an angular position as shown in FIG. 9, both ends of the through hole 201 are connected to the passage 171 of the carrier rail 17 and to the passage 181 of the carrier rail 18, so that a straight tube carry passage can be formed by the passage 171, the through hole 201 and the passage 181.

On the other hand, when the switching member 20 is rotated by the driving means by a predetermined angular position as shown in FIG. 10, both ends of the through hole 202 are connected to the passage 181 of the carrier rail 18 and to the passage 191 of the carrier rail 19, so that an L-shaped tube carry passage can be formed by the passage 181, the through hole 202 and the passage 191.

In the tube carrier apparatus 1D of this embodiment, the tube carry direction is any one of the following cases. Namely, in one case, the carrier rails 17 and 19 are determined to be the upstream side and the carrier rail 18 is determined to the downstream side, and in the other case, the carrier rail 18 is determined to be the upstream side and the carrier rails 17 and 19 are determined to be the downstream side, in the same way as with the case of the tube carrier apparatus 1C.

Figure 11:
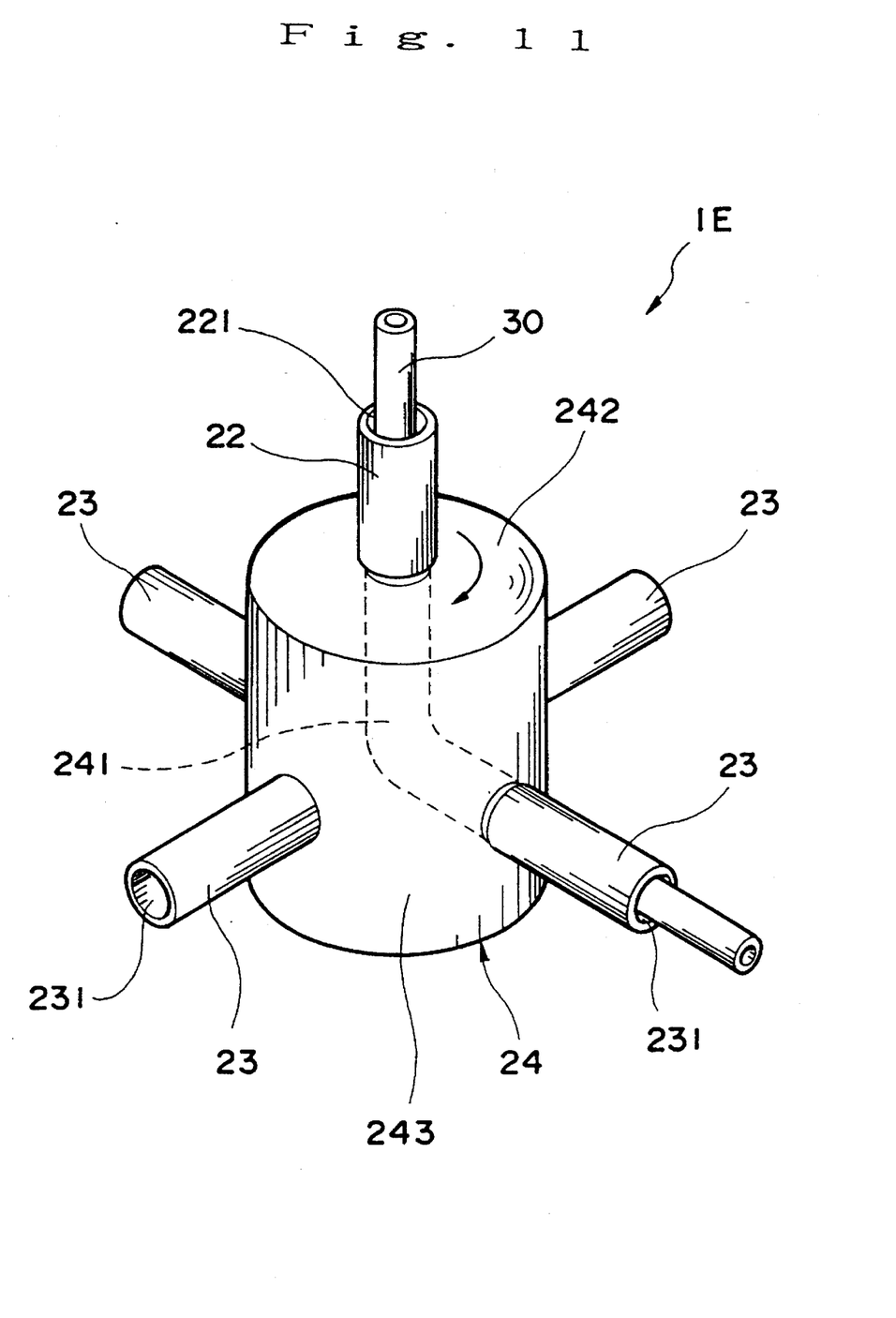
FIG. 11 is a perspective view showing a fifth embodiment of the tube carrier apparatus according to the present invention.

FIG. 11 is a perspective view showing the fifth embodiment of the tube carrier apparatus according to the present invention. The tube carrier apparatus 1E for carrying a flexible tube 30 in the longitudinal direction thereof is composed of a plurality of carrier rails 22 and 23 for determining tube carry passages, a switching member 24 interposed among these carrier rails, and driving means (not shown) for moving the switching member 24.

The switching member 24 is formed into a cylindrical member and formed with a bent through hole 241 which serves as a connection passage through which the tube 30 can be passed. The cross section of this through hole 241 is a circle in cross section. One end of the through hole 241 is open at a center of one end surface 242 of the switching member 24 and the other end of the through hole 241 is open at the outer circumferential surface 243 of the switching member 24.

Each of the carrier rails 22 and 23 is formed a tubular body with a hollow passage 221 or 231 of a circle in cross section which serves as a passage through which the tube 30 can be passed. The carrier rail 22 is disposed on the side of one end surface 242 of the switching member 24 concentrically with a rotary shaft of the switching member 24 so that the hollow passage 221 can be connected to one end of the through hole 241.

On the other hand, the four carrier rails 23 are disposed radially on the side of the outer circumferential surface 243 of the switching member 24 so that the other end of the through hole 241 can be connected to any one of the cavities 231 of the four carrier rails 23 when the switching member 24 is rotated. In this embodiment, the driving means (not shown) for rotating the switching member 24 is substantially the same as the driving means 21 as already described. The switching member 24 can be rotated by the driving means in one or two rotative directions.

Further, the inner diameters of the hollow passages 221 and 231 and the through hole 241 are determined to be slightly larger than the outer diameter of the tube 30 to be carried. Further, it is also preferable to form a cover layer of a low friction material on the inner surfaces of the cavities 221 and 231 and the through hole 241 respectively to improve slidability of the tube 30 to be carried, in the same way as the afore-mentioned embodiments.

In the tube carrier apparatus 1E of this embodiment, the tube carry direction is any one of the following two cases. Namely, in one case, the carrier rail 22 is determined to be the upstream side and the carrier rails 23 are determined to the downstream side, and in the other case, the carrier rails 23 are determined to be the upstream side and the carrier rail 22 is determined to be the downstream side, in the same way as with the case of the tube carrier apparatus 1D.

In this embodiment, the number of carrier rails 23 disposed on the side of the outer circumferential surface 243 of the switching member 24 is not limited to only four as shown in FIG. 11. Rather, in the tube carrier apparatus 1E of this embodiment, it is possible to dispose a relatively large number of carrier rails 23 on the side of the outer circumferential surface 243 of the switching member 24. Therefore, this embodiment has such an advantage that the carry passage can be selectively switched to one of a number of directions in spite of a simple structure.

In the above-mentioned tube carrier apparatuses 1A to 1E according to the present invention, it is possible to freely determine the tube carry passage by selecting any desired arrangement pattern of the carrier rails. Further, in accordance with this embodiment even if the carry passage is long or the carrier tube is long, the sequential control thereof is not complicated without providing complicated structure or without increasing the size of the apparatus. In addition, it is possible to securely carry the tube from two or more any carry start positions to two or more any carry destinations at a relatively high speed, in spite of the, simple apparatus structure and the small apparatus size.

In particular, if the tube carrier apparatus 1A is combined with at least one, of the tube carrier apparatuses 1B to 1E, it is possible to securely carry the tube from two or more any carry start positions to two or more any carry destinations at a relatively high speed. Further, it becomes possible to carry the tube from the carry start position to the carry destination with sequence operation, so that more rapid transportation of the tube can achieved.

Figure 12:
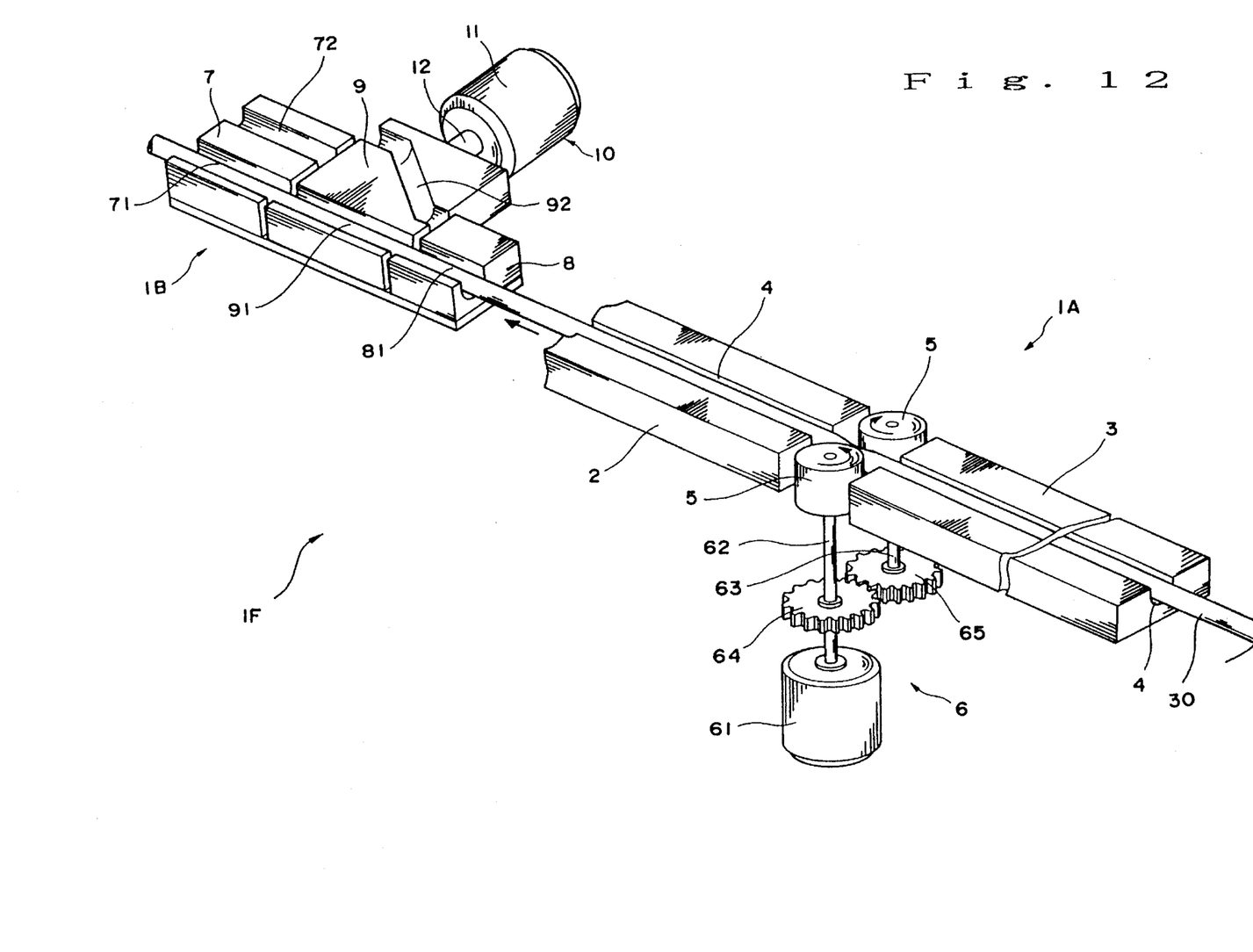
FIG. 12 is a perspective view showing a sixth embodiment of the tube carrier apparatus according to the present invention.

FIG. 12 is a perspective view showing the sixth embodiment of the present invention. The tube carrier apparatus 1F of this embodiment is constituted by combining the tube carrier apparatuses 1A and 1B both described above. In the tube carrier apparatus 1F shown in this drawing, a tube 30 carried by the tube carrier apparatus 1A can be selectively transported to any one of the grooves 71, 72 by the switching operation of the switching member 9 of the tube carrier apparatus 1B.

In this case, it should be noted that in the tube carrier apparatus 1F it is possible to use any one of the tube carrier apparatuses 1C–1E instead of the tube carrier apparatus 1B. Further, it is of course possible to additionally dispose another tube carrier apparatus 1B–1E at anywhere in the tube carrier apparatus 1A or at the upper or down stream side thereof.

The purpose of use of the tube carrier apparatus according to the present invention is not specifically limited. However, it is particularly preferable to utilize the tube carrier apparatus of the present invention in cases where the tubes connected to bags such as blood bags or blood component collecting bags are carried automatically to various processing destinations at which the tubes are to be sealed (by fusion), cut off, connected to other tubes or another members. By doing this, it also becomes possible to automatize transfer of liquid through a tube by utilization of the tube carrier apparatus according to the present invention, and therefore it can be applied to an automatized production lines of blood preparations.

Finally, it should be noted that, although the embodiments of the tube carrier apparatus according to the present invention have been described hereinabove with reference to the respective embodiments as shown by the attached drawings, the present invention is not limited to only these embodiments described hereinabove by way of examples.

What is claimed is:

1. A tube carrier apparatus for carrying a flexible tube in a longitudinal direction thereof, comprising:

at least one first passage through which the tube is to be carried;

a plurality of second passages through which the tube is to be carried;

tube feeding means provided in said first passage for feeding the tube along a longitudinal extent of said first passage, said tube feeding means comprising at least one pair of rollers between which the flexible tube is to be pinched and which are rotatable for advancing the pinched tube, and first driving means for rotating said rollers;

switching means rotatably or movably disposed between said first and second passages, said switching means including connection passages for selectively connecting said first passage and any one of said second passages; and second driving means for rotating or moving said switching means;

wherein said switching means is rotated or moved by said second driving means to select a connection between said first passage and any one of said second passages so as to distribute the tube fed from said first passage to any one of said second passages.

2. The tube carrier apparatus as claimed in claim 1, wherein each of said first and second passages and said connection passage has an inner surface, and a coating layer of low friction material is formed on said inner surface of each of said passages.

3. The tube carrier apparatus as claimed in claim 1, wherein each of said first and second passages is a groove formed in each of the carrier rails.

4. The tube carrier apparatus as claimed in claim 1, wherein each of said rollers has an outer circumferential surface adapted to contact the tube, and said outer circumferential surface of each roller being a rubber material.

5. The tube carrier apparatus as claimed in claim 1, wherein each of said rollers has an outer circumferential surface adapted to contact the tube and a rotary axis about which each of the rollers is rotatable, said first driving means including a motor which rotatably drives both of said rollers.

6. The tube carrier apparatus as claimed in claim 1, wherein said first passage and one of said second passages are arranged perpendicular to one another.

7. The tube carrier apparatus as claimed in claim 1, wherein said second driving means is operatively associated with said switching means to cause said switching means to rotate from a first position in which the at least one first passage is connected to one of the second passages and a second position in which the at least one first passage is connected to a different one of the second passages.

* * * * *

UNITED STATES PATENT AND TRADEMARK OFFICE
CERTIFICATE OF CORRECTION

PATENT NO. : 5,503,263
DATED : April 2, 1996
INVENTOR(S) : Takahiko WATANABE

It is certified that error appears in the above-indentified patent and that said Letters Patent is hereby corrected as shown below:

On the title page,

In Section [57], line 5, kindly delete "falls" and insert -- rails --.

In Column 2, line 31, delete "ally" and insert -- any --.

In Column 3, line 21, delete "tile" and insert -- the --.

In Column 5, line 12, delete "fall" and insert -- rail --.

In Column 5, line 59, after "some" and before "pairs", insert -- of the --.

In Column 9, line 51, delete "falls" and insert -- rails --.

Signed and Sealed this

Twenty-fifth Day of June, 1996

Attest:

BRUCE LEHMAN

Attesting Officer      Commissioner of Patents and Trademarks